April 26, 1966 J. L. BEATTY ETAL 3,247,793

THERMOGRAPHIC METHOD FOR IMAGING AN OFFSET MASTER

Filed March 27, 1963

INVENTORS
Julian Lee Beatty
Frederich O. Bach
BY Ooms, McDougall and Hersh
Att'ys United States Patent Office 3,247,793

Patented Apr. 26, 1966

3,247,793

THERMOGRAPHIC METHOD FOR IMAGING AN OFFSET MASTER

Julian Lee Beatty, Northbrook, and Frederich O. Bach, Elmhurst, Ill., assignors to A. B. Dick Company, Chicago, Ill., a corporation of Illinois Filed Mar. 27, 1963, Ser. No. 268,242
1 Claim. (Cl. 101—149.2)

This invention relates to the preparation of imaged thermographic masters from originals and to elements for use in the practice of same and relates more particularly to the imaging of a lithographic master from an original by the use of radiation techniques.

To the present, the preparation of an imaged lithographic master from an original embodied photographic processes wherein a negative is first prepared from the original and then a light sensitive coating on the lithographic plate is exposed to the developed negative to produce the imaged master. Such techniques require the use of expert labor for the proper preparation of the exposed negative and in the use thereof, for the development of the image on the presensitized photographic plate. It also entails the use of a more expensive lithographic plate, as well as a negative, and the various solutions required for the development of the negative and the imaged lithographic plate. It also calls for the use of a large number of steps, each of which introduces its own limitations and problems thereby to render the process complicated, expensive, and time consuming let alone the product of an imaged plate that is wet from the various development solutions.

The use of radiations as the sole media by which the image is developed on a lithographic plate to provide a dry process has heretofore been limited by the requirement to make use of an original which is transparent to the radiations whereby such radiations are capable of penetration through the original for access to the image to be reproduced on the lithographic surface of the lithographic plate. Radiation techniques for use in the preparation of an imaged lithographic plate directly from an original has not been available where the original is a two-sided printed original or where the original is opaque to the transmission of radiations, such as infrared.

It is an object of this invention to provide a method and materials for use in the preparation of an imaged lithographic plate via radiation of an original wherein the process is not limited to an original which is embodied on thin radiation transparent paper and/or to an original which is printed only on one side.

More specifically, it is an object of this invention to provide a shoot-through method and element for use in the preparation of an imaged lithographic master directly by radiation of a radiation absorbing heat or radiation regenerating image on an original which may be opaque or which may be printed only on one or both sides, and it is a related object to provide a simple and efficient process of the type described which makes use of inexpensive and readily available materials; which is capable of practice to produce an imaged master from which copy of good quality can be secured; which can be practiced by the use of inexperienced labor and with readily available equipment; and which does not in any way alter the original so that it can be used repeatedly for the preparation of imaged lithographic masters in accordance with the practice of this invention.

These and other objects and advantages of this invention will hereinafter appear and, for purposes of illustration, but not of limitation, an embodiment of the invention is shown in the accompanying drawings in which—

Figure 1:
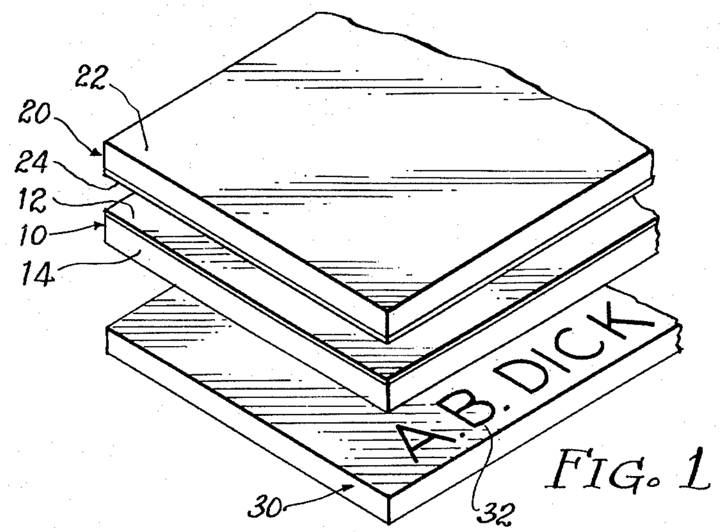
FIG. 1 is a perspective view which schematically shows the various elements in the order of their arrangement in the practice of this invention.
Figure 2:
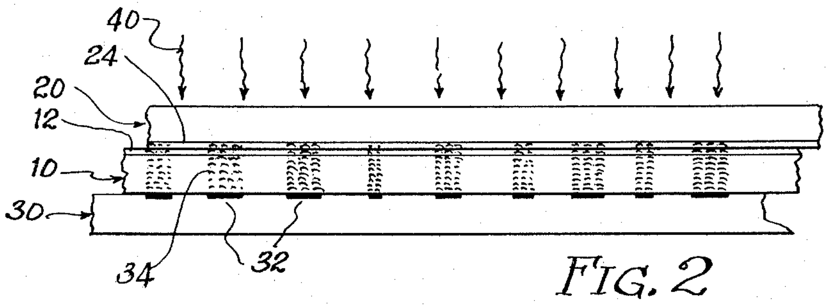
FIG. 2 is a side elevational view of the arrangement of elements during the preparation of the imaged lithographic master.
Figure 3:
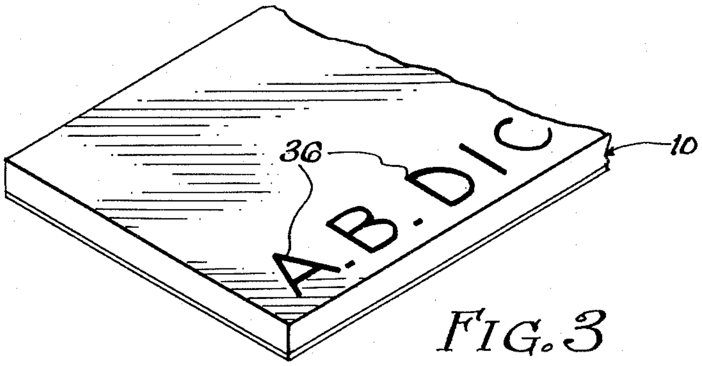
FIG. 3 is a perspective view of the lithographic master imaged in accordance with the practice of this invention.

The concepts of this invention require the use of (1) a lithographic master 10 having a water wettable, water insoluble, ink repellent, lithographic surface 12 wherein the entire master including the base 14 and the surface 12, which may be a part of the base, or formed by treatment thereof where a separate lithographic coating applied to one side of the base sheet, may be defined as infrared transmitting, i.e., that absorb little, if any, of the infrared radiations addressed onto the master; and (2) a transfer sheet 20 in the form of a base sheet 22 having a coating 24 on one side thereof in which a thermoplastic, ink receptive, water repellent, lithographic imaging material forms all or a part of said coating and in which the entire transfer sheet 20 including the base 22 and the coating 24 are infrared transmitting, as previously described.

In the practice of this invention the offset master (lithographic master) 10 is positioned between the original 30 and the transfer sheet 20 with the coated side 24 of the transfer sheet adjacent the lithographic surface 12 of the offset master and with the image 32 on the original 30 facing towards the offset master and the transfer sheet, all as illustrated in FIG. 1.

To image the offset master from the original, radiations 40 rich in infrared are addressed in a rather high concentration onto the assembled sheets with the radiations 40 being directed onto the transfer sheet whereby the radiations penetrate through the transfer sheet 20, through the offset master 10, to strike the original 30 whereby the infrared radiations striking the infrared radiation absorbing image portions 32 of the original are converted into heat, while the infrared radiations striking the nonabsorbing light or non-imaged portions of the original are either reflected, allowed to penetrate or otherwise absorbed to such a lesser degree as to avoid the generation of heat comparable to the intensity of the heat pattern generated by the infrared ray absorbed material in the image 32 of the original. The formed heat pattern 34 transfers back through the offset master 10 to the thermoplastic coating 24 of the transfer sheet 20 to reduce portions of the coating corresponding to the image of the original to a state for transfer from the transfer sheet to the surface 12 of the offset master 10 whereby an ink receptive, water repellent image 36 is formed on the master, corresponding to the original.

While it is desirable to radiate the assembly while the various sheets are in contact one with the other for better transfer of the generated heat pattern, it will be understood that slight spacing can exist between the original and the sheet adjacent thereto in the assembly when the infrared radiations absorbed by the image 32 in the original 30 are reconverted into radiations of longer wave lengths to which the transfer sheet or offset master are not transparent whereby such regenerated radiations are absorbed either by the transfer sheet or by the offset master to generate heat to form a heat pattern of the type previously described.

Further, it is unnecessary to generate a heat pattern having a temperature, when striking the coating 24 of transfer sheet 20, which is sufficient to reduce the thermoplastic material to a fused state since it is often times sufficient to provide a temperature at which the material in the coating is reduced to a more adhesive state in the heated portions than in the remainder whereby the heated portions of the coating, corresponding to the original, will adhere or otherwise transfer to the lithographic surface of the offset master to be retained by the surface upon separation of the radiated assembly to define the image 36 thereon.

As the offset master, use can be made of a film base such as cellulose triacetate, cellulose acetate, a polyester (Mylar), polypropylene or polyethylene coated with a coating weight from 3 to 7 pounds per 3000 square feet of surface area with a composition of the type set forth in the following examples:

*Example 1*

| | | |
|---|---|---|
| Talc | grams | 800 |
| Colloidal silica (Ludox) | ml | 2000 |
| Clay (Huber's Hydrafine) | grams | 200 |
| Perlite | do | 50 |
| Sodium silicate | ml | 50 |
| Starch (25% solution-Penford Gum) | grams | 300 |
| Vinylidene chloride-50% emulsion (Rhoplex R–9) | ml | 400 |

The above may be coated in coating weights of 3 to 7 pounds per 3000 square feet on 2 mil cellulose triacetate.

*Example 2*

| | Parts |
|---|---|
| Vinylidene chloride | 1 |
| Colloidal silica (Ludox HS) | 4–10 |
| Water in amounts to dilute the foregoing to between 15 to 20 percent by weight solids. | |

As the coated transfer sheet, use can be made of a film base or a thin paper base sheet coated with a clear or a colored wax or combinations either wax plasticized or softened with other various oils or oleaginous materials. This may be represented by an Eichner Dry-Copy wax coated sheet which is readily available in the United States market. It will be understood that the offset master can be a coated master of the type described, the surface of which has been treated, as by a suitable etch to render the surface water wettable, ink repellent and lithographic.

The original can be printed onto the back side of the offset master, but the concepts of this invention are addressed chiefly to a two-sided original or an opaque original as a separate element.

It will be further understood that changes may be made in the details of construction, arrangement and operation without departing from the spirit of the invention, especially as defined in the following claim.

We claim:

A process for the preparation of an imaged offset master by radiation of an imaged portion of an infrared absorbing and heat generating material, comprising the steps of providing a transparent sheet with the infrared ray absorbing image positioned as an original on one side and in which the transparent sheet is in the form of a lithographic master formed of a film of transparent plastic having a water receptive lithographic coating on the side opposite the original and in which the sheet is substantially transparent to infrared, positioning a transfer sheet having a coating containing an ink receptive, water repellent imaging material on the side of the offset master having the lithographic surface, said coated transfer sheet also being substantially transparent to infrared, directing radiations rich in infrared onto the assembly from the side having the transfer sheet whereby the radiations pass through the coated transfer sheet to the master and are absorbed by the imaged portions for conversion into a heat pattern corresponding to the image, said heat pattern causing sufficient change in the state of the coating on the transfer sheet to effect preferential adhesion of heated portions of the coating to the lithographic surface of the offset master upon separation, and then separating the offset master from the remainder.

References Cited by the Examiner

UNITED STATES PATENTS

| | | | |
|---|---|---|---|
| 2,939,009 | 5/1960 | Tien | 101—149.4 X |
| 3,122,997 | 3/1964 | Raczynski et al. | 101—149.2 |

DAVID KLEIN, *Primary Examiner.*